(12) United States Patent
Köster (10) Patent No.: US 12,172,713 B2
(45) Date of Patent: Dec. 24, 2024

(54) FIFTH-WHEEL COUPLING ARRANGEMENT WITH WEAR DETECTION

(71) Applicant: SAF-HOLLAND GmbH, Bessenbach (DE)

(72) Inventor: Mario Sebastian Köster, Bodman-Ludwigshafen (DE)

(73) Assignee: SAF-HOLLAND GmbH, Bessenbach (DE)

( * ) Notice: Subject to any disclaimer, the term of this patent is extended or adjusted under 35 U.S.C. 154(b) by 903 days.

(21) Appl. No.: 17/276,689

(22) PCT Filed: Mar. 25, 2020

(86) PCT No.: PCT/EP2020/058265
§ 371 (c)(1),
(2) Date: Mar. 16, 2021

(87) PCT Pub. No.: WO2020/200940
PCT Pub. Date: Oct. 8, 2020

(65) Prior Publication Data
US 2021/0316799 A1    Oct. 14, 2021

(30) Foreign Application Priority Data
Apr. 5, 2019   (DE) .................. 10 2019 108 954.9

(51) Int. Cl.
*B62D 53/10*    (2006.01)
*G07C 5/08*    (2006.01)

(52) U.S. Cl.
CPC .......... *B62D 53/10* (2013.01); *G07C 5/0841* (2013.01)

(58) Field of Classification Search
CPC .................................................... B62D 53/10
See application file for complete search history.

(56) References Cited

U.S. PATENT DOCUMENTS

2015/0158535 A1* 6/2015 Alldredge .......... B62D 53/0885
280/434
2019/0118876 A1* 4/2019 Schutt .................... B62D 53/10
(Continued)

FOREIGN PATENT DOCUMENTS

AU    2017314484    3/2019
CN    107531115 A    1/2018
(Continued)

OTHER PUBLICATIONS

European Patent Office; International Search Report; Jun. 25, 2020.

Primary Examiner — Tony H Winner
Assistant Examiner — Hosam Shabara
(74) Attorney, Agent, or Firm — Price Heneveld LLP (57) ABSTRACT

A fifth-wheel coupling arrangement includes, a plurality of wear sensors, a fifth-wheel coupling plate, a lock claw mounted on the fifth-wheel coupling plate configured to be movable in a first closing direction, a locking mechanism, with a stop, configured to be mounted on the fifth-wheel coupling plate configured to be movable in a second closing direction, wherein the fifth-wheel coupling plate has an insertion opening for a king pin, wherein the lock claw positively prevents the king pin from moving out of the insertion opening in a closed state of the fifth-wheel coupling arrangement and allows the king pin to move out of the insertion opening in an open state of the fifth-wheel coupling arrangement, wherein the wear sensor is configured to monitor a wear parameter of the fifth-wheel coupling arrangement, and wherein the wear sensor has a data output.

18 Claims, 4 Drawing Sheets

(56) References Cited

U.S. PATENT DOCUMENTS

| | | | | |
|---|---|---|---|---|
| 2019/0329612 A1* | 10/2019 | Gaufin | .................. | B62D 53/12 |
| 2020/0262256 A1* | 8/2020 | Gaufin | .................. | B62D 53/12 |
| 2022/0289317 A1* | 9/2022 | Dieter | ................ | B62D 53/0885 |

FOREIGN PATENT DOCUMENTS

| | | | | |
|---|---|---|---|---|
| CN | 106132816 B | 7/2018 | | |
| CN | 107735313 B | 9/2022 | | |
| DE | 3018905 A1 | 11/1980 | | |
| DE | 4402526 A1 * | 8/1994 | ......... | B62D 53/0871 |
| DE | 4402528 A1 | 8/1994 | | |
| EP | 0509137 A1 | 10/1992 | | |
| WO | WO-2017152234 A1 * | 9/2017 | .............. | B60D 1/36 |
| WO | 2018035566 A1 | 3/2018 | | |
| WO | 2019077587 A1 | 4/2019 | | |
| WO | 20200151619 A1 | 3/2020 | | |

\* cited by examiner

FIFTH-WHEEL COUPLING ARRANGEMENT WITH WEAR DETECTION

BACKGROUND OF THE INVENTION

The invention relates to a fifth-wheel coupling arrangement with a wear detector.

Fifth-wheels are already known from the prior art, these are usually arranged on a tractor vehicle of a semitrailer and serve to connect a tractor vehicle to a semitrailer. These fifth-wheel couplings serve to transmit a tractive force from the tractor vehicle to the semitrailer, in particular its kingpin. Due to the relative movements during travel between the fifth-wheel coupling components and the components of the semitrailer, wear takes place. However, despite its occurrence, this wear is often ignored and usually only determined during maintenance. As a result, parts of the fifth-wheel coupling plate may become so worn that safety is compromised.

It is therefore the object of the invention to increase the safety of the fifth-wheel coupling arrangement.

SUMMARY OF THE INVENTION

According to the invention, a fifth-wheel coupling arrangement comprises at least one wear sensor, preferably a plurality of wear sensors, a fifth-wheel coupling plate, a lock claw mounted indirectly and/or directly in a first closing direction on the fifth-wheel coupling plate so as to be movable in a first closing direction, a locking mechanism, in particular with a stop, which is mounted indirectly and/or directly on the fifth-wheel coupling plate so as to be movable in a second closing direction, and the fifth-wheel coupling plate having an insertion opening for a king pin, wherein, in particular in a closed state of the fifth-wheel coupling arrangement, the lock claw projects at least partially into the insertion opening, wherein the lock claw indirectly and/or directly positively prevents the king pin from moving out of the insertion opening in a closed state of the fifth-wheel coupling arrangement and allows the king pin to move out of the insertion opening in an opened state of the fifth-wheel coupling arrangement, wherein in particular the lock claw in the closed state of the fifth-wheel coupling arrangement contacts and/or can contact the stop in an indirect-locking and/or direct-locking manner, wherein the wear sensor is designed to monitor a wear parameter of the fifth-wheel coupling arrangement, wherein the wear sensor has a data output, in particular a cable. The fifth-wheel coupling arrangement according to the invention is used to connect a tractor vehicle and a trailer, in particular a semitrailer, to one another by force. This is done in particular by the fact that the fifth-wheel coupling plate of the fifth-wheel coupling arrangement has an insertion opening through which a king pin can be guided into the fifth-wheel coupling arrangement. The state of the fifth-wheel coupling arrangement in which moving out of the king pin from the insertion opening is possible (moving in likewise) is thereby the open state of the fifth-wheel coupling arrangement. In order to prevent the king pin from moving out of the insertion opening of the fifth-wheel coupling plate in the closed state, the fifth-wheel coupling arrangement has a lock claw and a locking mechanism, in particular with a stop. The lock claw is therein that component and/or that assembly of the fifth-wheel coupling arrangement which is designed to positively prevent, indirectly or directly, a moving out of the king pin in the closed state of the fifth-wheel coupling arrangement. In a preferred embodiment, the fifth-wheel coupling arrangement may also have a plurality of lock claws. Advantageously, this positive prevention of moving out is caused by means of indirect and/or direct contact between the lock claw and the kingpin. To enable the king pin to move out in the open state, the lock claw is, for example, mounted directly or indirectly on the fifth-wheel coupling plate in such a way that it can be moved in a first closing direction. The first closing direction can be both a translatory movement and, alternatively or additionally preferably, a rotatory movement. Advantageously, this rotational movement takes place about a first axis of rotation. For example, this first axis of rotation can be formed by a rotation bolt or a bearing bolt, which supports the lock claw relative to the fifth-wheel coupling plate. Advantageously, this bearing bolt extends from the fifth-wheel coupling plate in such a way that it extends from a surface which is arranged opposite the trailer surface of the fifth-wheel coupling plate. The trailer surface of the fifth-wheel coupling plate is the surface which serves for the trailer, in particular the semi-trailer, to rest on this surface in the coupled state. In particular, this trailer surface is designed in such a way that, on the one hand, it is free of kingpin contact in the closed state, and, on the other hand, the averaged normal of this surface is, in particular, parallel to the direction in which the kingpin extends. In addition to the lock claw, the fifth-wheel coupling arrangement according to the invention also has a locking mechanism which advantageously has a stop. This locking mechanism serves to fix the lock claw in the closed state of the fifth-wheel coupling arrangement in such a way and/or to restrict its freedom of movement in such a way that the king pin is prevented from "coming out", which can also be referred to as "moving out" or "disengaging", from the fifth-wheel coupling arrangement. This prevention of the opening of the fifth-wheel coupling arrangement is in particular carried out indirectly and/or directly positively by, for example, contacting the lock claw with the stop, wherein an actual contacting does not necessarily have to take place, but rather these components are designed to be able to contact indirectly and/or directly in order to positively prevent a change in the position of the lock claw in relation to the fifth-wheel coupling plate—at least in one direction—in order to prevent the king pin from exiting the fifth-wheel coupling arrangement in the closed state. In other words, this may mean that there may be some play between the stop of the locking mechanism and the lock claw, even in the closed state. This locking mechanism with the stop is therein arranged on the fifth-wheel coupling plate in such a way that it can be moved in a second closing direction. This second closing direction can in particular also be translatory and/or rotatory. Preferably, the second closing direction is a rotational movement if this rotational movement takes place in the same plane as the first closing direction. It is particularly preferred if the locking mechanism with the stop is mounted indirectly or directly on the fifth-wheel coupling plate via a rotational bearing, in particular a rotational bolt and/or a bearing bolt. For ease of operation of the locking mechanism, the fifth-wheel coupling arrangement may include an unlocking handle that extends beyond the fifth-wheel coupling plate. In addition to the fifth-wheel coupling plate, the lock claw and the locking mechanism with the stop, the fifth-wheel coupling arrangement according to the invention also has a wear sensor capable of monitoring a wear parameter of the fifth-wheel coupling arrangement or a state of wear of the fifth-wheel coupling arrangement based on the wear parameter, in particular by collecting wear sensor data. Such a wear parameter of the fifth-wheel coupling arrangement may be formed, for example, by a play between the king pin and the lock claw, by the change in the material thickness of the coupling plate, the stop, the locking mechanism and/or the lock claw, or by a static and/or dynamic change in the position of the fifth-wheel coupling components relative to each other, which, however, is caused only by the wear of the fifth-wheel coupling arrangement. For example, the wear sensor for detecting these wear parameters may be an inductive proximity sensor, an ultrasonic sensor, or a similarly suitable non-contact sensor. Alternatively or additionally preferred, the sensor may be a contacting sensor. Further alternatively or additionally preferred, the wear sensor may also be a vibration sensor. The wear sensor according to the invention has a data output, in particular a cable, for transmitting the (raw) measurement data acquired by it. For example, this data output can be in the form of a cable or in the form of wireless transmission, such as Bluetooth, WLAN or radio networks. The design of the fifth-wheel coupling arrangement according to the invention—using a wear sensor with a data output—enables automatic monitoring of the fifth-wheel coupling arrangement. Therefore, the state of wear can be continuously detected or determined by detecting at least one wear parameter of the fifth-wheel coupling arrangement, so that the potential hazards to the fifth-wheel coupling arrangement caused by wear can be reduced as a result, since a state of wear, in particular a critical state of wear, can be detected at an early stage.

Advantageously, the fifth-wheel coupling arrangement comprises at least two, preferably at least three, wear sensors, wherein the at least two, preferably at least three, wear sensors advantageously monitor different wear parameters of the fifth-wheel coupling arrangement. By providing multiple wear sensors, the state of wear of the fifth-wheel coupling arrangement can be monitored more reliably. It is preferable if these individual wear sensors detect different wear parameters of the fifth-wheel coupling arrangement, since in particular further information content can also be obtained by correlating these different wear sensor data or wear parameters. It is advantageous if the different wear sensors are based on different measurement methods, so that these can be used additionally and/or alternatively as redundant measurement information.

Advantageously, at least one wear sensor is designed to determine and/or monitor a material thickness of the fifth-wheel coupling plate, in particular in the region of a trailer surface. By determining the material thickness of the fifth-wheel coupling plate, its wear can be assessed in a reliable manner. In particular, measuring the material thickness of the fifth-wheel coupling plate in the region of the trailer surface can ensure that wear can be reliably detected despite the lubricant applied to the trailer surface. The decisive material thickness is in particular the material thickness of the fifth-wheel coupling plate, advantageously in the region of the trailer surface, in the direction perpendicular to the decisive surface. In particular, no impurities or lubricants applied to and/or present on the fifth-wheel coupling plate are decisive for the measurement of the material thickness. In other words, this means that the material thickness of the fifth-wheel coupling plate is formed only by the actual material of the fifth-wheel coupling plate. For example, an ultrasonic sensor can be used to be able to detect the material thickness of the fifth-wheel coupling plate.

Preferably, the fifth-wheel coupling arrangement comprises at least one bearing block and a bearing shell, wherein the bearing shell supports the fifth-wheel coupling plate relative to the bearing block, wherein the bearing block has a contact area, wherein the contact area is designed to indirectly and/or directly support the bearing block on a vehicle, wherein at least one wear sensor is designed to monitor the state of wear of the bearing shell. For example, this may be done by determining the material thickness or strength of the bearing shell by the at least one wear sensor. For example, this can be done by determining a distance between the components surrounding the bearing shell and/or by determining the actual material thickness of the bearing shell. Alternatively preferred or additionally preferred, the state of wear of the bearing shell, which is a wear parameter of the fifth-wheel coupling arrangement, can be monitored by determining a lowering of the fifth-wheel coupling plate relative to a contact area. This can be achieved, for example, by ultrasound, radar, or by an inductive proximity switch as a wear sensor.

In a preferred embodiment, the contact area lies in a contact plane, wherein the at least one wear sensor is designed to monitor the state of wear of the bearing shell by determining a distance of the contact plane to a part of the fifth-wheel coupling plate, in particular a measuring surface of the fifth-wheel coupling plate. In this way, a particularly simple and reliable determination of this wear parameter or of the resulting state of wear of the bearing shell can be achieved. The contact plane of the contact area is in particular the plane formed by the surfaces designed to support the bearing block directly or indirectly relative to a vehicle. In other words, the contact area or the contact plane is that surface or plane on which the bearing block is arranged on the vehicle, in particular the commercial vehicle.

Advantageously, the measuring surface is concave. The concave design of the measuring surface can reduce the probability of the occurrence of incorrect measurements. It is particularly preferred if the measuring surface is designed in such a way that the focal point (or the focal point axis) of the concave measuring surface lies on a rotational bearing axis of the fifth-wheel coupling arrangement or the fifth-wheel coupling plate. Alternatively or additionally preferably, the corresponding wear sensor lies in the focal point or on the focal point axis. The focal point is that point in which all outwardly pointing normals of the surface of the measuring surface intersect. In particular, however, it should be noted that—in case of a curved design of the measuring surface with respect to only one axis—not only one focal point exists but a focal point axis (e.g. in case of a semi-cylindrical concave design of the measuring surface). Alternatively or additionally preferred, the measuring surface can also be convex.

In an advantageous further development, the measuring surface is part of a tensioning device. The tensioning device is in particular the component of the fifth-wheel coupling arrangement which clamps the bearing shell to the fifth-wheel coupling plate. This allows indirect wear measurement in a very precise manner.

Preferably, at least one wear sensor is a non-contact sensor, in particular an ultrasonic sensor or an inductive proximity switch. By designing at least one wear sensor as a contactless sensor, it can be achieved that this wear sensor itself operates with low wear, so that a particularly long service life of the sensor results. In addition to a contactless design of the wear sensor as an ultrasonic sensor, it can also be designed as an inductive sensor, a capacitive sensor or an optical sensor. Additionally preferred, the wear sensor can be designed using the piezoceramic effect. This type of design of the wear sensor also has a long service life, because the piezoceramics have a particularly low-wear type of measurement acquisition.

Particularly preferably, at least one wear sensor is a contacting sensor. In this way, costs can be saved in particular.

Advantageously, at least one wear sensor is designed to monitor a play, in particular due to wear, of a part of the locking mechanism, in particular by determining the distance of the part of the locking mechanism to a measuring point of the fifth-wheel coupling plate, advantageously in the direction of the second closing direction. This wear of the locking mechanism is determined in particular in relation to a measuring point, wherein the measuring point may advantageously be located at the fifth-wheel coupling plate. For example, the measuring point may be formed by a projection of the fifth-wheel coupling plate. Alternatively or additionally preferred, the measuring point can also be formed by a projection which is fixed to the fifth-wheel coupling plate in a force-fit, form-fit and/or material-fit manner. The measurement of the distance and/or the play is advantageously carried out in the second closing direction. Should the second closing direction be a rotational direction, the measurement is advantageously carried out in a direction tangential to the second closing direction, the relevant tangential direction being in particular that direction which is tangential to the second closing direction in the closed position of the fifth-wheel coupling arrangement.

Advantageously, the determination of the wear parameters of the fifth-wheel coupling arrangement is performed in the closed and/or in the open condition. In other words, this may mean that the wear sensor is designed to detect measured values in the closed and/or in the open state of the fifth-wheel coupling arrangement. This can provide a particularly versatile wear monitoring system.

Advantageously, at least one wear sensor is a vibration sensor. By monitoring the vibrations, in particular the vibrations of the lock claw, the fifth-wheel coupling plate and/or the locking mechanism, as wear parameters, conclusions can be drawn about the state of wear of the respective component by means of the detected frequency and/or the detected amplitude, advantageously at the resonant frequency of the respective component. For example, the amplitude of the vibrations of the locking assembly and/or the lock claw usually increases sharply when these two components have a particularly large play relative to each other, in particular in the closed state. Therefore, the vibration sensor provides a particularly simple and reliable measurement method. In addition, a vibration sensor—and the other types of wear sensors—can also be used to measure during operation and/or travel, because the resonant frequencies caused by operation and/or travel are usually in a significantly lower frequency band than the vibrations caused by wear. For this, it may be necessary that the (raw) measurement data of the wear sensor must be suitably cleaned from interfering influences, therefore a suitable cleaning of the data may be necessary. This may be done, for example, by low-pass and/or high-pass filtering and/or by smoothing and/or by interpolation of the data. This "measured value cleaning" can be carried out, for example, by an appropriately designed evaluation unit, a PLC and/or by a filter bank, which is/are directly and/or indirectly connected in terms of data technology to the data output of the wear sensor. It should be noted at this point, however, that the "measured value correction" can be applied while the vehicle is moving and/or stationary not only when using vibration sensors, but can also be used fundamentally with all wear sensor types described.

In an advantageous further embodiment, the vibration sensor monitors the vibration of the lock claw, in particular in the direction of the first closing direction, and/or wherein the fifth-wheel coupling arrangement comprises a king pin, and wherein the vibration sensor monitors the vibration of the king pin. By monitoring the vibrations of the lock claw as a wear parameter, conclusions can be drawn in a simple manner about the state of wear of the system, in particular with regard to the bearing of the lock claw and the wear of the stop. Preferably, the fifth-wheel coupling arrangement features a king pin. By monitoring the vibrations of the kingpin as a wear parameter, the play between the kingpin and the components that surround the kingpin in the closed state can be determined in a simple manner. In other words, by arranging the vibration sensor such that it monitors the vibrations of the kingpin, it can be achieved that the freedom of movement of the kingpin in the closed state in the fifth-wheel coupling arrangement can be determined. Therefore, by arranging the vibration sensor in such a way that it monitors the vibrations of the lock claw and/or the king pin, conclusions can be drawn in a simple manner about the state of wear of the fifth-wheel coupling arrangement, in particular by comparative monitoring or determination of the phase relation of the vibrations relative to one another.

In an advantageous embodiment, the fifth-wheel coupling arrangement comprises at least two wear sensors that are vibration sensors. The arrangement of the two vibration sensors makes it possible, in particular, for vibration modes which have a node at the location of the one vibration sensor to be detected reliably or at least more reliably by the second vibration sensor. Thus, the arrangement of at least two vibration sensors enables reliable monitoring of the vibrations of the fifth-wheel coupling arrangement. Advantageously, these two vibration sensors are designed on different components and/or for monitoring the vibration of different components of the fifth-wheel coupling arrangement.

In a preferred further development, two of the vibration sensors of the fifth-wheel coupling arrangement are connected to a comparison unit, wherein the comparison unit is designed to compare the measurement results of the vibration sensors and wherein the comparison unit is designed to determine a state of wear of the fifth-wheel coupling from the comparison of the measurement results or the wear parameters. For example, the comparison unit may be part of an evaluation unit. In particular, the comparison can take place both in the time domain and in the frequency domain. It is particularly preferred if this comparison takes place both in the frequency domain and in the time domain, in particular by means of a temporally local transformation, such as by means of a Gabor transformation. By using the temporally local transformations of the data in the frequency domain, a differentiated observation in both the frequency domain and the time domain can take place simultaneously, so that a more reliable conclusion can be drawn about the wear condition of the fifth-wheel coupling arrangement.

Preferably, the data output of the wear sensor, in particular all data outputs of the wear sensors, is connected in terms of information technology to an evaluation unit, the evaluation unit being designed to determine a state of wear of the fifth-wheel coupling arrangement on the basis of the monitoring data of the wear sensor. In other words, this can mean that at least one wear sensor advantageously connects all wear sensors to an evaluation unit, in particular a computer or a PLC control unit, in terms of data technology in such a way that the recorded monitoring data or measurement data of the wear sensors can be transmitted to this monitoring unit. Advantageously, the evaluation unit is therein part of the fifth-wheel coupling arrangement and/or arranged on the fifth-wheel coupling arrangement. In order to increase the information content of the recorded wear data or measurement data of the wear sensors, it is particularly useful if the evaluation unit carries out correlation analyses between a wide variety of measurement data. This can increase the information content of the wear sensor data. In addition or alternatively preferred, the state of wear can be determined using a neural network and/or a time series analysis. For this purpose, it is preferred if the evaluation unit is designed to determine the state of wear of the fifth-wheel coupling arrangement by means of a neural network and/or by means of a time series analysis. The required training data of the neural network can be provided, for example, by measurements on newly manufactured and on old—replaced during maintenance—fifth-wheel coupling arrangements.

In a preferred further development, the evaluation unit is connected to a display unit, the display unit being designed to display the state of wear of the fifth-wheel coupling arrangement determined by the evaluation unit. Advantageously, the state of wear of the fifth-wheel coupling arrangement is displayed in such a way that the state of wear of the fifth-wheel coupling arrangement is represented by a traffic light system. This traffic light system can thereby take place both for each individual measured value of the respective wear sensors and/or for each individual wear parameter and/or by the representation of a traffic light for a total state of wear of the fifth-wheel coupling arrangement. Preferably, the determination of the overall state of wear of the fifth-wheel coupling arrangement is thereby performed by a suitable weighting of the individual wear parameters or the individual measurement data of the individual wear sensors. The display unit may, for example, be part of a dashboard of a tractor vehicle and/or be a separate screen which is arranged within the cab. Alternatively or additionally preferred, the display unit may also be formed by a visual means arranged in the area of the fifth-wheel coupling arrangement and/or directly on the fifth-wheel coupling arrangement, in particular the fifth-wheel coupling plate. This makes it possible for the user of the fifth-wheel coupling arrangement to be informed directly via the display unit of the state of wear of the fifth-wheel coupling arrangement.

BRIEF DESCRIPTION OF THE DRAWINGS

Further advantages and features of the present invention will be apparent from the following description with reference to the figures. Individual features of the embodiments shown can thereby also be used in other embodiments, unless this has been expressly excluded.

DETAILED DESCRIPTION OF THE PREFERRED EMBODIMENTS

Figure 1:
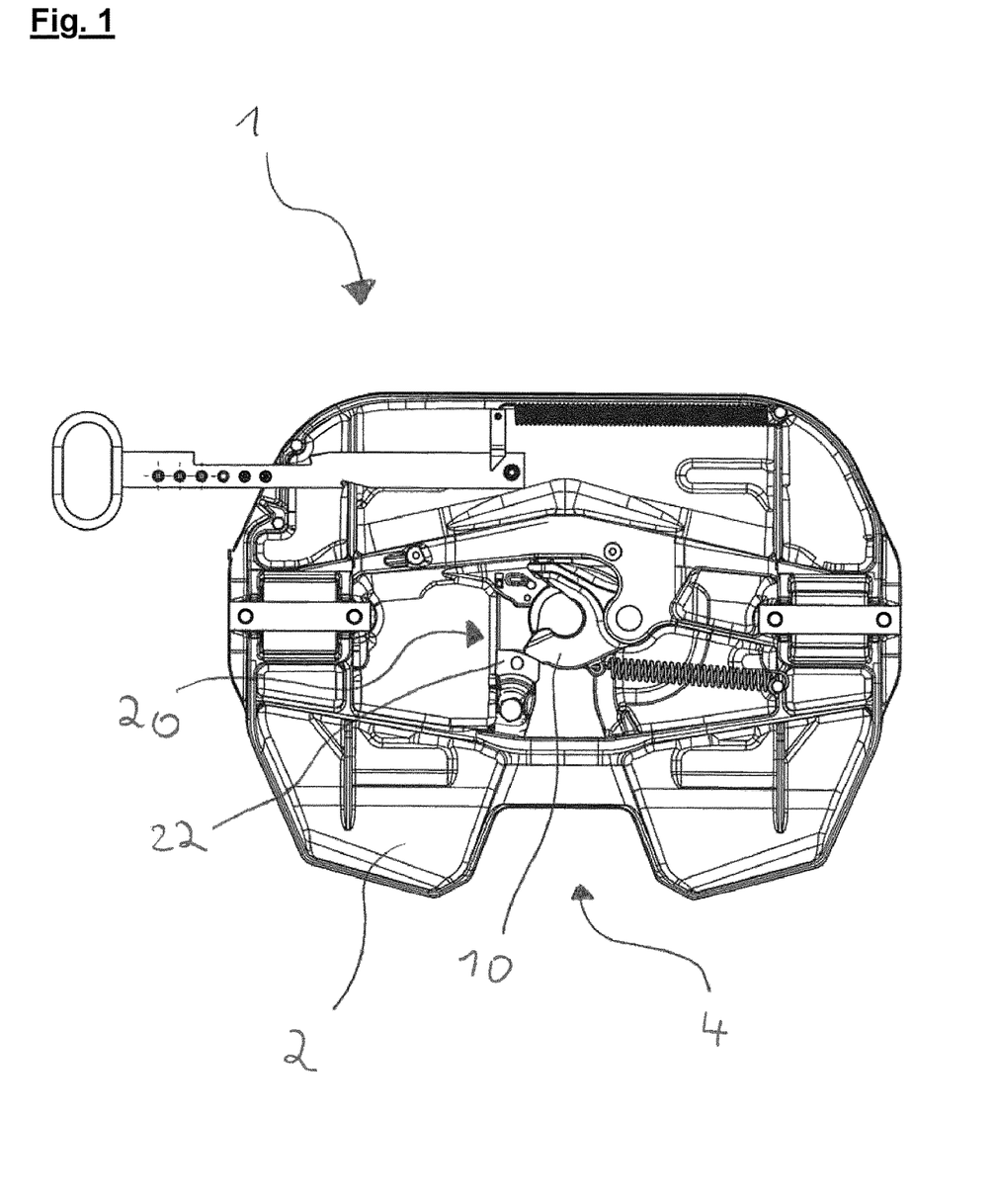
FIG. 1 is a bottom plan view of a fifth-wheel coupling arrangement according to the invention.

In FIG. 1, a fifth-wheel coupling arrangement 1 is shown, wherein this fifth-wheel coupling arrangement 1 is shown from below in order to achieve a simple type of representation. The fifth-wheel coupling arrangement 1 according to the invention has a locking mechanism 20 comprising a stop 22. This stop 22 is formed, for example, from a metallic material, in particular plain bearing material, and/or from a plastic. The stop 22 is firmly connected to the locking mechanism and moves with it. In this case, the stop 22 makes direct contact with the lock claw 10 so that, in a closed state of the fifth-wheel coupling arrangement 1, a king pin cannot move out of the insertion opening 4 of the fifth-wheel coupling plate 2.

Figure 2:
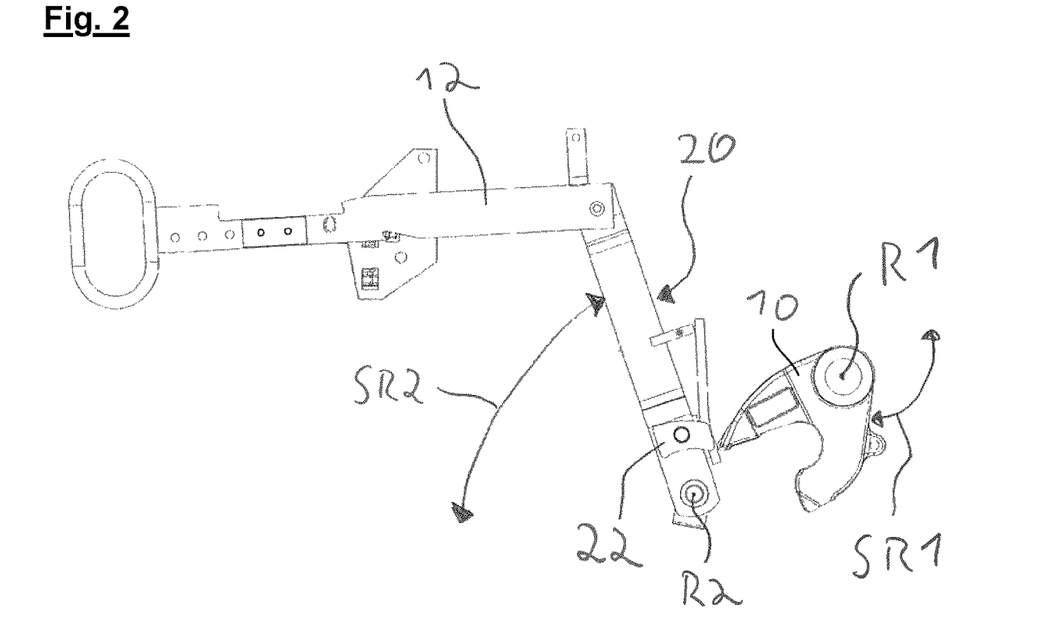
FIG. 2 is a detailed bottom plan view of the locking mechanism and lock claw of the fifth wheel coupling arrangement.

FIG. 2 shows a detailed view of the locking mechanism 20 and the lock claw 10 of the fifth-wheel coupling arrangement 1 according to the invention. In order to actuate the locking mechanism 20, the fifth-wheel coupling arrangement 1 has an unlocking handle 12 to achieve a displacement of the locking mechanism 20 and the stop 22 in the direction of the second closing direction SR2—by a manual actuation. In the illustrated embodiment example, the second closing direction SR2 is a rotational movement about the second axis of rotation R2. In the opened state of the fifth-wheel coupling arrangement 1 shown in FIG. 2, the lock claw 10 does not contact the locking arrangement 20, in particular the stop 22, so that in the embodiment shown it is possible to move out a king pin of the fifth-wheel coupling arrangement. The lock claw 10, in order to be transferred from the open to the closed state, is supported in such a way that it is movable along the first closing direction SR1. In the embodiment shown in FIG. 2, the first closing direction SR1 is a rotational movement about the first axis of rotation R1.

Figure 3:
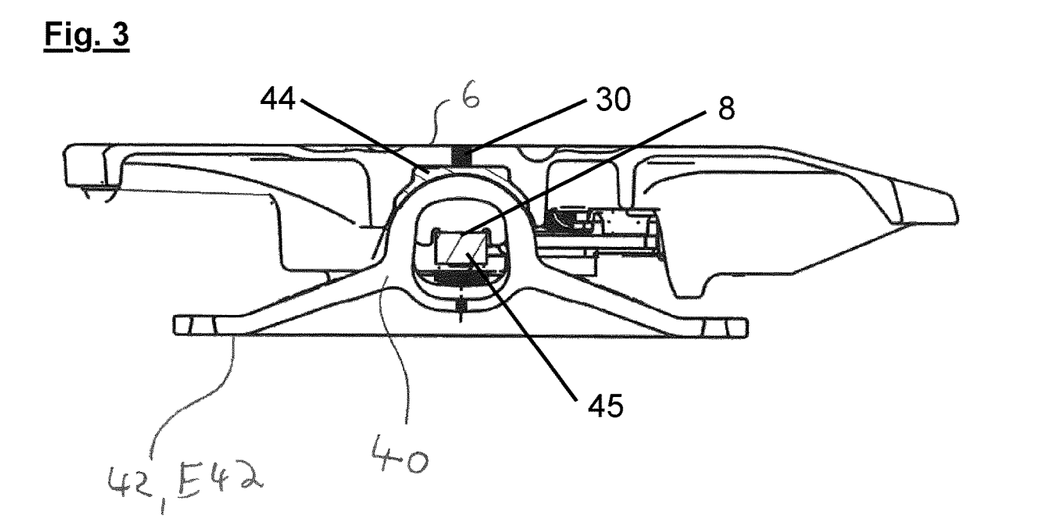
FIG. 3 is a side elevation view of a fifth-wheel coupling arrangement according to the invention.

In FIG. 3, a side view of a fifth-wheel coupling arrangement 1 according to the invention is shown, which has a wear sensor 30 configured to detect a wear parameter of the fifth-wheel coupling arrangement. In the embodiment shown, the wear sensor 30 measures a distance to the measuring surface 8, which is part of a tensioning device 45. This allows, among other things, indirect conclusions to be drawn about the material thickness of the bearing shell 44—as a measured wear parameter. The fifth-wheel coupling arrangement 1 has a bearing block 40, which has a contact area 42. This contact area 42 lies in the contact plane E42. Distally opposite the contact plane E42 is the trailer surface 6 of the fifth-wheel coupling plate 2. This trailer surface 6 can, for example, be formed parallel to the support plane E42, as shown by way of example in FIG. 3.

Figure 4:
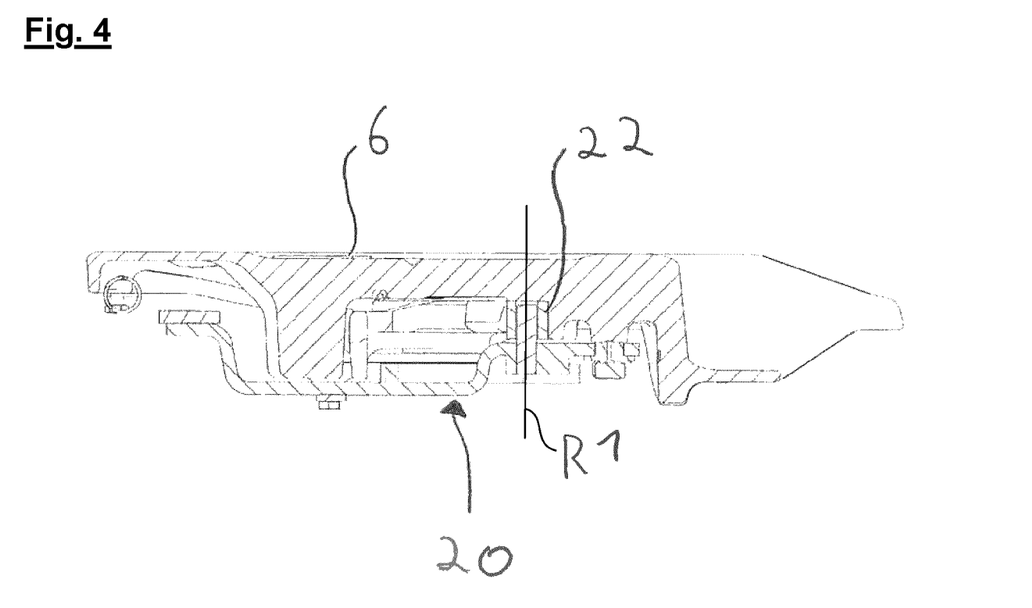
FIG. 4 is a sectional side elevation view of a fifth-wheel coupling arrangement according to the invention.

FIG. 4 shows a section through a fifth-wheel coupling arrangement 1 according to the invention. The locking mechanism 20 has a stop 22 which is connected to the main latch of the locking mechanism 20 via a bolt. This main latch may be engaged indirectly or directly with the unlocking handle 12.

Figure 5:
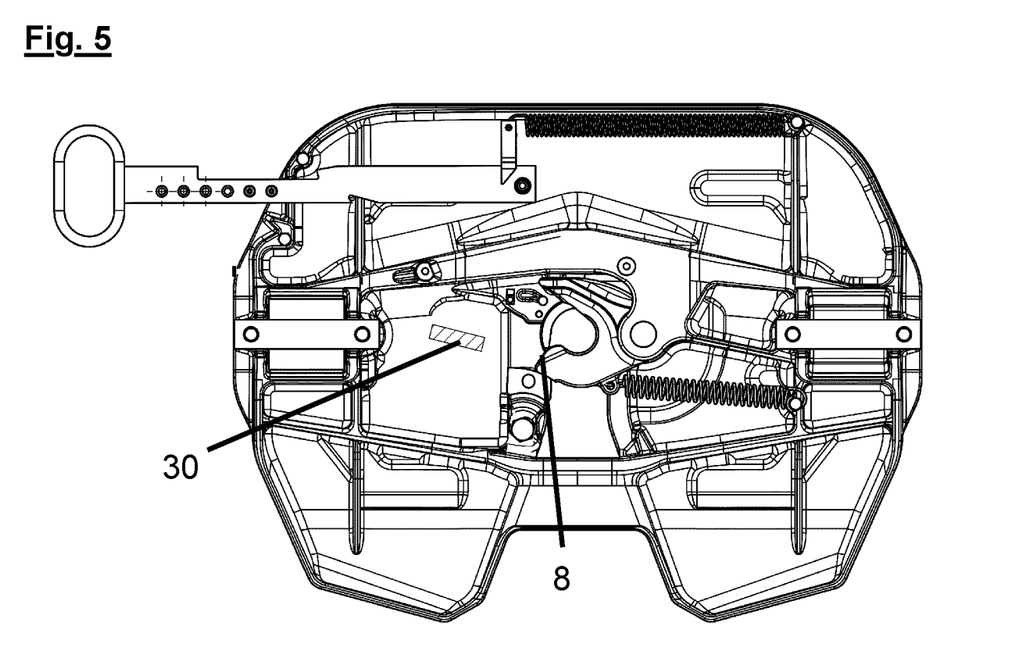
FIG. 5 and FIG. 6 are bottom plan views of further embodiments according to the invention.

FIG. 5 shows an embodiment of a fifth-wheel coupling arrangement 1 according to the invention with a wear sensor 30 which detects a distance to the measuring surface 8.

Figure 6:
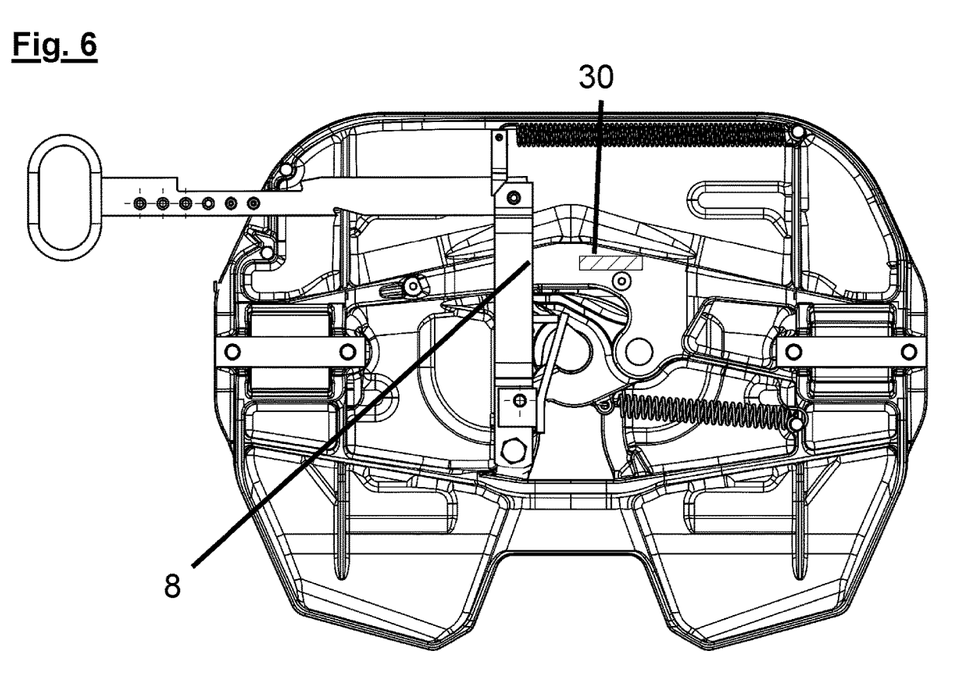

FIG. 6 shows a further embodiment of a fifth-wheel coupling arrangement 1 according to the invention with a wear sensor 30 that detects a distance to the measuring surface 8. In this case, the measuring surface 8 is located on the main latch of the locking mechanism.

LIST OF REFERENCE SIGNS

1 Fifth-wheel coupling arrangement
2 Fifth-wheel coupling plate
4 Insertion opening
6 Trailer surface
8 Measuring surface 10 Lock claw
12 Unlocking handle
20 Locking mechanism
22 Stop
30 Wear sensor
40 Bearing block
42 Contact area
44 Bearing shell
45 Tensioning device
E42 Contact plane
SR1 First closing direction
SR2 Second closing direction
R1 First axis of rotation
R2 Second axis of rotation

The invention claimed is:

1. A fifth-wheel coupling arrangement, comprising:
at least one wear sensor;
a fifth-wheel coupling plate;
a lock claw mounted indirectly and/or directly on the fifth-wheel coupling plate and configured to be movable in a first closing direction; and
a locking mechanism with a stop which is mounted indirectly and/or directly on the fifth-wheel coupling plate and configured to be movable in a second closing direction;
wherein the fifth-wheel coupling plate has an insertion opening for a king pin;
wherein the lock claw is configured to indirectly and/or directly positively prevent the king pin from moving out of the insertion opening in a closed state of the fifth-wheel coupling arrangement and is configured to allow the king pin to move out of the insertion opening in an open state of the fifth-wheel coupling arrangement;
wherein the wear sensor is configured to monitor a wear parameter of the fifth-wheel coupling arrangement;
wherein the wear sensor has a data output that includes a cable; and
wherein the at least one wear sensor is configured to determine and/or monitor a material thickness of the fifth-wheel coupling plate in the region of a trailer surface by directly sensing the material thickness of the fifth-wheel coupling plate.

2. The fifth-wheel coupling arrangement according to claim 1, wherein the at least one wear sensor includes at least two wear sensors, and wherein the at least two wear sensors monitor different wear parameters of the fifth-wheel coupling arrangement from one another.

3. The fifth-wheel coupling arrangement according to claim 1, wherein the at least one wear sensor includes at least three wear sensors, and wherein the at least three wear sensors monitor different wear parameters of the fifth-wheel coupling arrangement from one another.

4. The fifth-wheel coupling arrangement according to claim 1, wherein the fifth-wheel coupling arrangement comprises at least one bearing block and a bearing shell, wherein the bearing shell supports the fifth-wheel coupling plate relative to the bearing block, wherein the bearing block has a contact area configured to indirectly and/or directly support the bearing block on a vehicle, and wherein at least one wear sensor is configured to monitor the state of wear of the bearing shell.

5. The fifth-wheel coupling arrangement according to claim 4, wherein the contact area lies in a contact plane, wherein the at least one wear sensor is configured to monitor the state of wear of the bearing shell by determining a distance of the contact plane to a measuring surface of the fifth-wheel coupling plate.

6. The fifth-wheel coupling arrangement according to claim 5, wherein the measuring surface is concave.

7. The fifth-wheel coupling arrangement according to claim 5, wherein the measuring surface is part of a tensioning device.

8. The fifth-wheel coupling arrangement according to claim 1, wherein the at least one wear sensor includes a non-contact sensor.

9. The fifth wheel coupling arrangement according to claim 8, wherein the non-contact sensor includes an ultrasonic sensor.

10. The fifth-wheel coupling arrangement according to claim 1, wherein the at least one wear sensor is configured to monitor a play due to wear of a part of the locking mechanism.

11. The fifth-wheel coupling arrangement of claim 10, wherein monitoring the play due to wear of the part of the locking mechanism includes determining the distance of the part of the locking mechanism to a measuring point of the fifth-wheel coupling plate in the direction of the second closing direction.

12. The fifth-wheel coupling arrangement according claim 1, wherein the at least one wear sensor includes a vibration sensor.

13. The fifth-wheel coupling arrangement according to claim 12, wherein the vibration sensor is configured to monitor the vibrations of the lock claw in a direction of the first closing direction.

14. The fifth-wheel coupling arrangement according to claim 12, wherein the fifth-wheel coupling arrangement comprises a king pin, and wherein the vibration sensor monitors the vibrations of the king pin.

15. The fifth-wheel coupling arrangement according to claim 12, wherein the at least one sensor includes at least two vibration sensors.

16. The fifth-wheel coupling arrangement according to claim 15, wherein the at least two vibration sensors are connected to a comparison unit, wherein the comparison unit is configured to compare the measurement results of the vibration sensors, and wherein the comparison unit is configured to determine a state of wear of the fifth-wheel coupling from the comparison of the measurement results.

17. The fifth-wheel coupling arrangement according to claim 1, wherein a data output of at least one wear sensor is connected in terms of information technology to an evaluation unit, and wherein the evaluation unit is configured to determine a state of wear of the fifth-wheel coupling arrangement on the basis of the monitoring data of the at least one wear sensor.

18. The fifth-wheel coupling arrangement according to claim 17, wherein the evaluation unit is connected to a display unit, and wherein the display unit is configured to display the state of wear of the fifth-wheel coupling arrangement determined by the evaluation unit.

* * * * *